US012659599B2

(12) United States Patent
 Ishiwata et al.

(10) Patent No.: US 12,659,599 B2
(45) Date of Patent: Jun. 16, 2026

(54) IMAGE PROCESSING APPARATUS, IMAGE PROCESSING METHOD, AND NON-TRANSITORY COMPUTER-READABLE MEDIUM

(71) Applicant: JVCKENWOOD Corporation, Yokohama (JP)

(72) Inventors: Tadashi Ishiwata, Yokohama (JP); Keita Hayashi, Yokohama (JP); Hirofumi Yamamoto, Yokohama (JP); Keiji Tsuchiya, Yokohama (JP); Yasufumi Nakaaki, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 5 days.

(21) Appl. No.: 18/811,075

(22) Filed: Aug. 21, 2024

(65) Prior Publication Data

US 2024/0414445 A1 Dec. 12, 2024

Related U.S. Application Data

(63) Continuation of application No. PCT/JP2022/040714, filed on Oct. 31, 2022.

(30) Foreign Application Priority Data

Mar. 8, 2022 (JP) ................................. 2022-035189

(51) Int. Cl.
 *H04N 23/75* (2023.01)
 *G06T 7/00* (2017.01)
 (Continued)

(52) U.S. Cl.
 CPC ........... *H04N 23/75* (2023.01); *G06T 7/0002* (2013.01); *H04N 17/002* (2013.01); *H04N 23/23* (2023.01);
 (Continued)

(58) Field of Classification Search
 CPC ...... H04N 23/23; H04N 25/68; H04N 17/002; H04N 25/57; H04N 23/20; H04N 23/60;
 (Continued)

(56) References Cited

U.S. PATENT DOCUMENTS

2022/0377263 A1* 11/2022 Hayashi .................... G01J 1/02
2023/0007158 A1 1/2023 Hayashi et al.

FOREIGN PATENT DOCUMENTS

JP 2005333620 A * 12/2005
JP 2006319403 A * 11/2006
 (Continued)

*Primary Examiner* — Masum Billah
(74) *Attorney, Agent, or Firm* — PROCOPIO, CORY, HARGREAVES & SAVITCH LLP

(57) ABSTRACT

A determination unit determines whether there is a damaged pixel in a range where a predetermined saturated pixel is detected from thermal image data acquired by capturing an image of a shutter having a uniform temperature with a sensor in a state where incidence of light on the sensor is blocked by the shutter. The shutter control unit closes the shutter when the predetermined saturated pixel is detected, and when there is no damaged pixel in the thermal image data captured when the shutter is closed, performs control to open the shutter immediately or after a lapse of a predetermined period of time that is determined in advance as a maximum time required for detection processing of the predetermined saturated pixel, or when there is a damaged pixel, performs control to open the shutter after a lapse of a time in which recovery of the damaged pixel is expected.

4 Claims, 6 Drawing Sheets

(51) Int. Cl.
*H04N 17/00* (2006.01)
*H04N 23/23* (2023.01)

(52) U.S. Cl.
CPC .............. *G06T 2207/10048* (2013.01); *G06T 2207/30168* (2013.01); *G06T 2207/30252* (2013.01)

(58) Field of Classification Search
CPC ........ H04N 23/71; H04N 23/72; H04N 23/80; H04N 23/81
USPC ......................................................... 348/164
See application file for complete search history.

(56) References Cited

FOREIGN PATENT DOCUMENTS

| JP | 2021110552 A | * | 8/2021 | ............. H04N 25/57 |
| WO | 2022/018900 A1 | | 1/2022 | |

\* cited by examiner

IMAGE PROCESSING APPARATUS, IMAGE PROCESSING METHOD, AND NON-TRANSITORY COMPUTER-READABLE MEDIUM

CROSS REFERENCE TO RELATED APPLICATION

This application is a continuation application of PCT/JP2022/040714 filed on Oct. 31, 2022, which is based upon and claims the benefit of priority from Japanese patent application No. 2022-035189, filed on Mar. 8, 2022, the disclosure of which is incorporated herein in its entirety by reference.

BACKGROUND

The present disclosure relates to an image processing apparatus, an image processing method, and a program.

There has been proposed a system in which a far-infrared camera is mounted on a vehicle to detect pedestrians or the like. Since the far-infrared camera captures a thermal image of the image capturing range, when an image of an object with a temperature equal to or higher than the upper limit of a set dynamic range is captured, pixels are saturated, and if the sun is in the image capturing range, the pixels in the range of the sun are damaged. Therefore, there has also been proposed a technique for protecting a far-infrared sensor from capturing an image of the sun.

For example, Japanese Unexamined Patent Application Publication No. 2021-110552 discloses a technique for protecting a sensor for acquiring a thermal image by closing a shutter when detecting saturated pixels that can be caused by the sun.

SUMMARY

In the technique described in Japanese Unexamined Patent Application Publication No. 2021-110552, it is possible to protect a sensor for capturing a thermal image using a shutter when the sun is included in the image capturing range, but while the shutter is closed to protect the sensor, objects such as pedestrians cannot be detected.

Therefore, there is a need for a technique for minimizing the time for which the shutter is closed to protect the sensor for capturing a thermal image.

An image processing apparatus according to the present disclosure includes: a saturation detection unit that detects a predetermined saturated pixel, which is a saturated pixel that satisfies a predetermined condition, from thermal image data acquired by a sensor that captures a thermal image; and a shutter control unit that controls operation of a shutter that blocks incidence of light on the sensor. The image processing apparatus includes a determination unit that determines whether there is a damaged pixel in a range where the saturation detection unit detects the predetermined saturated pixel from the thermal image data acquired in a state where incidence of light on the sensor is blocked by the shutter. The shutter control unit closes the shutter when the saturation detection unit detects the predetermined saturated pixel, and performs control to open the shutter at a timing based on a result of determination by the determination unit.

An image processing method according to the present disclosure includes a saturation detection step of detecting a predetermined saturated pixel, which is a saturated pixel that satisfies a predetermined condition, from thermal image data acquired by a sensor that captures a thermal image. The image processing method includes a step of performing control to close a shutter that blocks incidence of light on the sensor when the predetermined saturated pixel is detected in the saturation detection step. The image processing method includes a determination step of determining whether there is a damaged pixel in a range where the predetermined saturated pixel is detected in the saturation detection step from the thermal image data acquired in a state where incidence of light on the sensor is blocked by the shutter. The image processing method includes a step of performing control to open the shutter at a timing based on a result of determination in the determination step.

A program according to the present disclosure causes a computer to execute the following processing. The processing includes a saturation detection step of detecting a predetermined saturated pixel, which is a saturated pixel that satisfies a predetermined condition, from thermal image data acquired by a sensor that captures a thermal image. The processing includes a step of performing control to close a shutter that blocks incidence of light on the sensor when the predetermined saturated pixel is detected in the saturation detection step. The processing includes a determination step of determining whether there is a damaged pixel in a range where the predetermined saturated pixel is detected in the saturation detection step from the thermal image data acquired in a state where incidence of light on the sensor is blocked by the shutter. The processing includes a step of performing control to open the shutter at a timing based on a result of determination in the determination step.

DETAILED DESCRIPTION

Embodiments of the present invention will be described hereinafter, but it is not intended to limit the invention according to the claims to the following embodiments. Further, all the configurations described in the embodiments are not necessarily indispensable as means for solving the problem. For the clarification of the description, the following description and the drawings are partially omitted and simplified as appropriate.

First Embodiment

Figure 1:
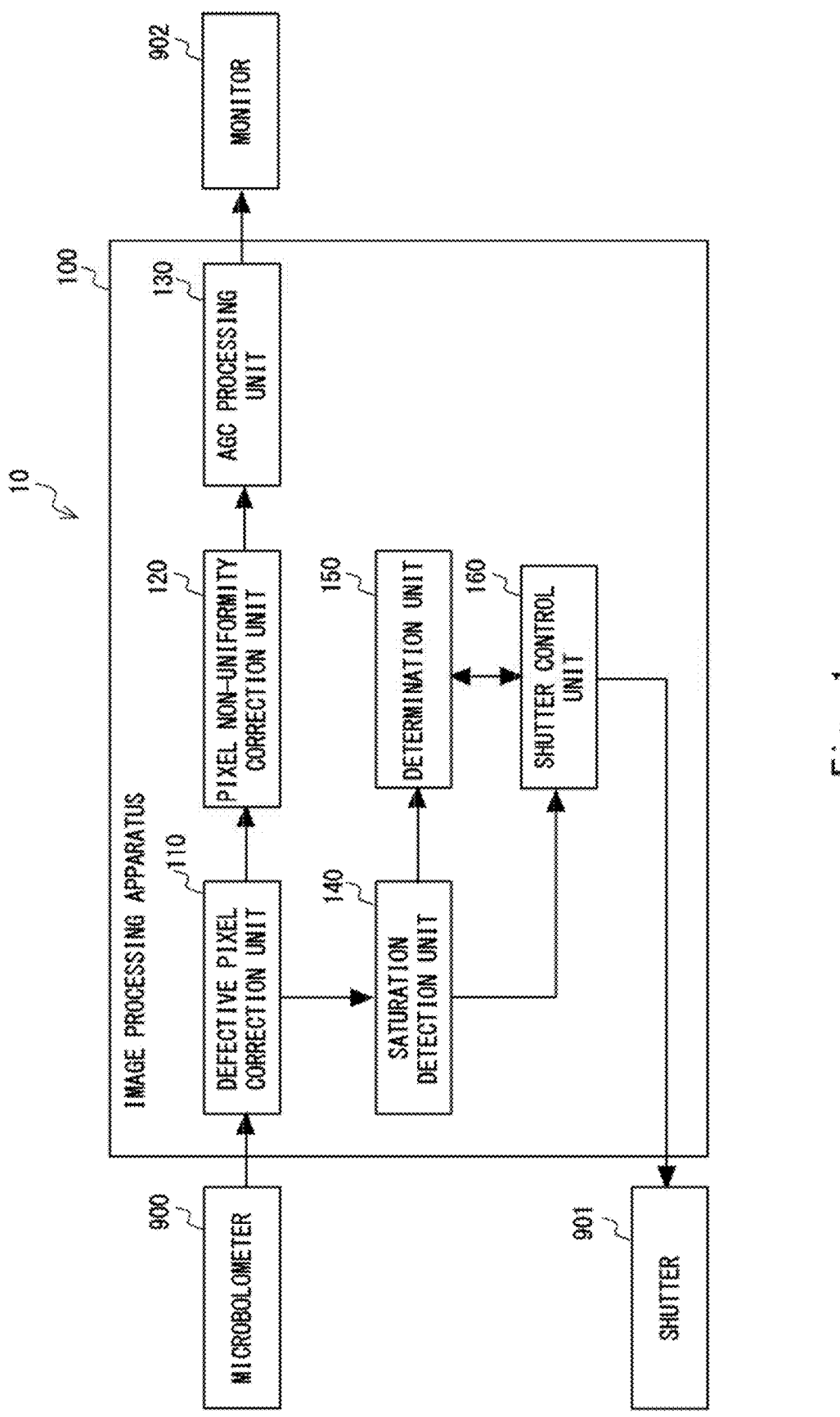
FIG. 1 is a block diagram showing an example configuration of a thermal image display system including an image processing apparatus according to a first embodiment.

A first embodiment will be described below with reference to the drawings. FIG. 1 is a block diagram showing an example configuration of a thermal image display system including an image processing apparatus according to the first embodiment. An image processing apparatus 100 shown in FIG. 1 is a component of a thermal image display system 10 that captures a thermal image such as a thermal image of the periphery of an automobile and displays it on a monitor. The thermal image display system 10 can include the image processing apparatus 100 according to this embodiment, a microbolometer 900, a shutter 901, and a monitor 902 as main components.

First, each component connected to the image processing apparatus 100 will be outlined.

The microbolometer 900 is an example of a sensor for capturing a thermal image, and is composed of infrared detection elements arranged in a matrix, and the infrared detection elements detect far-infrared rays. That is, the microbolometer 900 is a type of far-infrared sensor. Further, the microbolometer 900 photoelectrically converts the detected far-infrared rays to generate imaging data, and supplies the generated imaging data to a defective pixel correction unit 110 described later of the image processing apparatus 100.

For example, the microbolometer 900 can be installed on a mobile body with the infrared detection element surface directed to capture a thermal image of the periphery of the mobile body. For example, when the mobile body is an automobile, the microbolometer 900 is installed to face the forward direction of the automobile so as to be able to capture an image of the traveling direction of the automobile. However, the microbolometer 900 may be installed to face other directions.

The shutter 901 includes a mechanism for blocking the incidence of light on the microbolometer 900, and allows or suppresses the incidence of external light on the microbolometer 900. The operation of the shutter 901 is controlled by a shutter control unit 160 described later. When the shutter 901 is open, the shutter 901 allows external light to pass and causes the microbolometer 900 to receive the external light. When the shutter 901 is closed, the shutter 901 blocks external light to protect the microbolometer 900 from the external light.

The monitor 902 is a display apparatus installed for being able to present information to a user, and includes, for example, a liquid crystal panel or an organic Electro Luminescence (EL) panel. The monitor 902 is connected to an AGC processing unit 130 described later of the image processing apparatus 100, receives the imaging data from the AGC processing unit 130, and displays the received imaging data. The monitor 902 may also display an image showing a recognized person in addition to the imaging data. Note that the monitor 902 is not an essential component in this embodiment.

The image processing apparatus 100 will be described below.

The image processing apparatus 100 can include an arithmetic unit such as a CPU (Central Processing Unit) or an MCU (Micro Controller Unit). Further, the image processing apparatus 100 can include a non-volatile or a volatile memory such as a flash memory or a DRAM (Dynamic Random Access Memory) and a control board composed of other electric circuits in addition to the aforementioned arithmetic unit. In the image processing apparatus 100, programs are embedded in the aforementioned arithmetic unit and the like, and the functions of each unit as described below can be implemented by hardware or by a combination of a program and hardware.

The image processing apparatus 100 acquires thermal image data (hereinafter referred to as imaging data), which is data of a thermal image captured by the microbolometer 900, and performs preset processing on the acquired imaging data. The microbolometer 900 is an example of a sensor for capturing a thermal image. The image processing apparatus 100 can thus include an image data acquisition unit that acquires the imaging data from the sensor for capturing a thermal image. Further, the image processing apparatus 100 can output the imaging data on which the preset processing is performed to the monitor 902.

The image processing apparatus 100 can include the defective pixel correction unit 110, a pixel non-uniformity correction unit 120, the AGC processing unit 130 (AGC=Auto-Gain-Control), a saturation detection unit 140, a determination unit 150, and the shutter control unit 160. Further, the image processing apparatus 100 can also include other functions, such as a function to recognize a person or the like based on a thermal image captured by the microbolometer 900.

The function of the image processing apparatus 100 to recognize a person, for example, uses a recognition model, which is obtained through machine learning of thermal images in which a person or an animal is captured, for the acquired thermal image, so that a person captured as a thermal image can be recognized. Their recognition result is displayed on the monitor 902 together with the imaging data based on the captured thermal image, so that the presence of a person can be presented to the driver of an automobile or the like. The image processing apparatus 100 can be configured to be able to recognize animals or the like in addition to people.

The defective pixel correction unit 110 receives the imaging data from the microbolometer 900 and corrects data related to defective pixels included in the imaging data. For example, the defective pixel correction unit 110 detects the coordinates of the defective pixels in a state where the shutter 901 is closed, and stores the detected coordinates of the defective pixels. In this example, although not shown, the defective pixel correction unit 110 may be configured to receive a signal for opening/closing control of the shutter 901 from the shutter control unit 160.

Further, the defective pixel correction unit 110 corrects the stored data of the defective pixels by generating interpolation data from data of adjacent pixels. The defective pixel correction unit 110 supplies the corrected imaging data to each of the pixel non-uniformity correction unit 120 and the saturation detection unit 140. The correction method in the defective pixel correction unit 110 is not limited, and the image processing apparatus 100 can employ a configuration in which the defective pixel correction unit 110 is not included.

The pixel non-uniformity correction unit 120 corrects the non-uniform state of pixels in the imaging data received from the defective pixel correction unit 110. The non-uniform state of each pixel is caused by, for example, the variation in characteristics of each pixel. The pixel non-uniformity correction unit 120 corrects the imaging data by adjusting the gain or the offset of each pixel using, for example, a technique called NUC (Non-Uniformity Correction). The pixel non-uniformity correction unit 120 supplies the corrected imaging data to the AGC processing unit 130. The correction method in the pixel non-uniformity correction unit 120 is not limited, and the image processing apparatus 100 may not include the pixel non-uniformity correction unit 120.

The AGC processing unit 130 receives the imaging data from the pixel non-uniformity correction unit 120 and adjusts the contrast of the imaging data. By adjusting the contrast of the imaging data, the AGC processing unit 130 generates an image that is easy for a user to view when the thermal image is displayed on the monitor 902. Further, by adjusting the contrast of the imaging data, the AGC processing unit 130 can output a thermal image suitable for recognition processing when object recognition processing is performed on the thermal image. The AGC processing unit 130 uses, for example, a histogram equalization technique, such as contrast-limited adaptive histogram equalization, for the imaging data.

The saturation detection unit 140 detects a predetermined saturated pixel from the imaging data acquired by the microbolometer 900. Here, the predetermined saturated pixel is a saturated pixel that satisfies a predetermined condition, and the predetermined condition and the saturated pixel will be described later. In the example configuration in FIG. 1, the saturation detection unit 140 receives the imaging data from the defective pixel correction unit 110 and detects a predetermined saturated pixel from the received imaging data (the corrected imaging data).

When detecting a predetermined saturated pixel, the saturation detection unit 140 supplies a signal indicating the detection result to the determination unit 150 and the shutter control unit 160. The signal supplied to the determination unit 150 includes information indicating the position of the predetermined saturated pixel or the pixel value (luminance value) of the predetermined saturated pixel so that they can be referenced by the determination unit 150.

The shutter control unit 160 controls the operation of the shutter 901. As described above, the shutter 901 includes a mechanism for blocking the incidence of light on the microbolometer 900. The shutter control unit 160 performs control to close the shutter 901 when the saturation detection unit 140 detects a predetermined saturated pixel.

Next, a saturated pixel will be described. A saturated pixel can be defined as a pixel that is fully saturated, or defined as a pixel that is fully saturated and a pixel that is substantially saturated. A fully saturated pixel refers to a pixel in a state where the pixel data has reached the upper limit, and refers to a pixel that has exceeded the dynamic range in which the amount of far-infrared radiation from a subject can be captured as a temperature difference.

For example, when the sensor for capturing a thermal image is the microbolometer 900 taken as an example, a pixel that receives far-infrared rays changes in resistance value according to the intensity of the far-infrared rays, and it is converted into an electrical signal. By converting this electrical signal into a digital signal and performing signal processing, the temperature of the subject is visualized. In this process, the saturation detection unit 140 can detect a pixel having a value equal to or greater than the maximum value of the digital signal, for example, a pixel having a value of 3FFFh or more in the case of 14 bits, as a fully saturated pixel. However, the bit width of the digital signal varies depending on the system.

Figure 2:
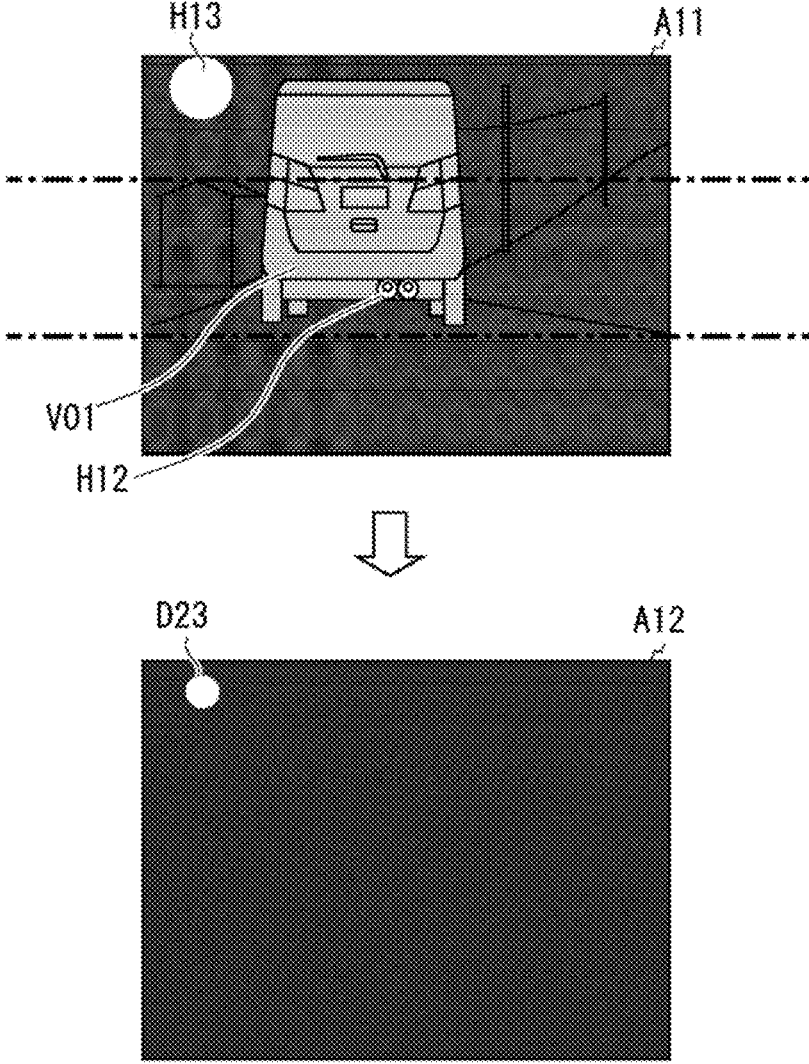
FIG. 2 is a schematic diagram showing an example of imaging data acquired before and after shutter closing control in the image processing apparatus in FIG. 1.

Next, the predetermined condition and an example of processing for detecting a predetermined saturated pixel in the saturation detection unit 140 using the predetermined condition will be described with reference to FIG. 2. FIG. 2 is a schematic diagram showing an example of imaging data acquired before and after shutter closing control in the image processing apparatus 100 in FIG. 1.

The saturation detection unit 140 detects, for example, saturated pixels from the imaging data received from the defective pixel correction unit 110, and can extract saturated pixels in the case where there are N or more detected saturated pixels adjacent to each other as predetermined saturated pixels, where N is, for example, an integer of 4 or more. Specifically, when less than four pixels such as one pixel show saturated values, the saturation detection unit 140 treats the saturation of the pixels as noise. The saturation detection unit 140 can extract a pixel group consisting of a plurality of saturated pixels from the imaging data received from the defective pixel correction unit 110, and output the extracted pixel group as predetermined saturated pixels.

The saturation detection unit 140 may use the position of a pixel in the imaging data as the predetermined condition for extracting a saturated pixel. Taking a case where the thermal image display system 10 is mounted on an automobile as an example, an example of a condition for the position of the target pixel in the imaging data that can be used as the predetermined condition or included in predetermined condition will be given.

In the in-vehicle microbolometer 900, it is assumed that sunlight is often incident on the upper part of the infrared detection element surface. On the other hand, in the microbolometer 900, the obtained pixels may also be saturated in, for example, a part that is likely not to damage the pixels, such as the muffler of the vehicle in front, that is, a high-temperature part due to factors other than sunlight. As described above, since this embodiment performs control to close the shutter 901 when a predetermined saturated pixel is detected, the frequency of closing increases if the shutter 901 is closed even for a high-temperature part due to factors other than sunlight.

Therefore, it is desirable that scenes where the microbolometer 900 is protected by the closing control of the shutter 901 are basically scenes where sunlight is detected. Therefore, the predetermined condition can be a condition under which only sunlight can be detected by some means, that is, a condition under which the saturation of pixels caused by something other than sunlight is excluded.

For example, when the saturation detection unit 140 detects a saturated pixel in the upper region of the upper, middle, and lower regions obtained by dividing the infrared detection element surface into thirds (the upper ⅓ region of the whole region), the saturated pixel can be estimated to be a pixel as a result of the incidence of sunlight.

As an example, a case will be described where the imaging data acquired from the in-vehicle microbolometer 900 is as shown by a thermal image A11 in FIG. 2. The thermal image A11 taken as an example is one frame image of the imaging data obtained by capturing the travelling direction of an automobile on which the thermal image display system 10 is mounted.

The thermal image A11 includes an image in which another vehicle V01 is captured, and includes a saturated pixel group H13 due to the sun being captured in the upper left. In the thermal image A11, since an electromagnetic wave radiated by an object is detected, a part of the thermal image A11 where heat is high is brightly displayed. Therefore, the thermal image A11 includes a saturated pixel group H12 due to a muffler with a particularly high temperature in the vehicle V01 being captured. Here, the following description will be made assuming that the pixels at the positions corresponding to the muffler and the sun are saturated pixels in the thermal image A11.

In this case, as the division positions are shown by alternate long and short dash lines in the thermal image A11, the thermal image represented by the imaging data is divided into three regions: upper, middle, and lower regions, and the upper region is set as a region where sunlight can be incident. That is, a condition of being a pixel included in the upper region is included as the predetermined condition.

Thus, when the image processing apparatus 100 is applied to an automobile and the assumption as described above is employed, the predetermined condition can be a condition of being a pixel included in the above-described upper region of the thermal image represented by the imaging data among the saturated pixels.

The saturation detection unit 140 can detect saturated pixels from the imaging data received from the defective pixel correction unit 110, and extract and output a pixel located in the above-described upper region of the thermal image A11 from among the detected saturated pixels as a predetermined saturated pixel. Alternatively, the saturation detection unit 140 can detect saturated pixels from the pixel group in the above-described upper region of the thermal image A11 represented by the imaging data received from the defective pixel correction unit 110, and can output the detected saturated pixels as predetermined saturated pixels.

As a result, in an automobile on which a thermal image display system 10 is mounted, it is possible not to determine the saturated pixel group H12 that can be generated by capturing an image of the muffler of the vehicle in front as predetermined saturated pixels, and the shutter 901 needs not be closed only due to the detection of such saturated pixels.

The predetermined condition can be a condition unrelated to the degree of saturation as illustrated by an example here, but can also be a condition related to the degree of saturation, or be both a condition related to the degree of saturation and a condition unrelated to the degree of saturation. In the following, for the simplification of the description, a case will be described where a condition related to the degree of saturation is the predetermined condition itself. However, when other conditions are also included in predetermined conditions, the determination may be executed as a predetermined saturated pixel when all the conditions included in the predetermined conditions are satisfied.

Further, as a condition related to the degree of saturation, a condition that M or more adjacent pixels are substantially saturated can be employed, where M is an integer of 2 or more. For example, M can be 9, and "substantially saturated" can mean that the pixel value has a luminance value of 98% or more of the upper limit. In this case, when nine or more adjacent pixels are 98% or more of the upper limit of the luminance value, the saturation detection unit 140 can detect the pixel group as predetermined saturated pixels.

Next, the determination unit 150 will be described. The determination unit 150 determines whether or not there is a damaged pixel in a range where the saturation detection unit 140 detects predetermined saturated pixels from the imaging data acquired in a state where the incidence of light on the microbolometer 900 is blocked by the shutter 901. This imaging data is data obtained by capturing an image of the shutter 901. Further, the above range refers to a range where saturation satisfying the predetermined condition is detected, and can refer to, for example, the same positions as those of the predetermined saturated pixels. Alternatively, the above range can refer to a region having a predetermined shape such as a rectangle surrounding a predetermined saturated pixel group, a region consisting of a predetermined saturated pixel group and a pixel group adjacent to its periphery, or the like.

The determination of a damaged pixel will be supplemented. Since the shutter 901 has basically a uniform temperature, when the infrared detection elements are not damaged, a thermal image when the shutter 901 is closed has uniform outputs on the whole screen. On the other hand, for example, in the thermal image A12 in FIG. 2, the pixel values corresponding to the positions of the saturated pixel group H13 due to the sun in the thermal image A11 are shown to be a damaged pixel group D23 showing abnormal values. Thus, since the pixel values (output levels) of the pixels corresponding to infrared detection elements that have more or less been damaged will show abnormal values, there will be a difference compared with the pixel values of normal pixels such as peripheral normal pixels.

Therefore, it can be determined that the larger this difference in pixel value, the greater the damage to the pixel. Using this, the determination unit 150 can determine whether a pixel is damaged or not by performing threshold processing regarding the difference in pixel value from normal pixels. This threshold processing can determine whether a predetermined value set in advance has been exceeded or not, and if it has been exceeded, it can be determined that it is a damaged pixel. Further, by setting a plurality of predetermined values as thresholds, the level of damage can be determined.

If the determination unit 150 also receives the pixel values of unsaturated pixels from the saturation detection unit 140, the pixel value of a peripheral normal pixel to be compared can be determined from among the pixel values of the unsaturated pixels. For example, the pixel value to be compared can be determined by calculating a statistical value (e.g., an average value, a median value, or a minimum value) of the unsaturated pixels.

Alternatively, the pixel value to be compared can be a statistical value of the pixel values of all the pixels included in a target thermal image (a frame image of the imaging data), that is, a frame statistical value. Alternatively, the pixel value to be compared can be, for example, a statistical value for at least one pixel group of the pixel group in the middle and the pixel group in the lower region taken as an example in the thermal image A11 in FIG. 2, or the pixel value at a predetermined position among the pixel groups in the middle and lower regions.

As a simpler example, when the pixel value of a predetermined saturated pixel to be determined is equal to or greater than a predetermined value, the determination unit 150 can also determine that it is more or less damaged.

The shutter control unit 160 performs control to open the shutter 901 at a timing based on the result of determination by the determination unit 150. That is, in a case where the shutter control unit 160 has performed control to close the shutter 901 when the saturation detection unit 140 has detected a saturated pixel satisfying the above predetermined condition (a predetermined saturated pixel), the shutter control unit 160 performs control to open the shutter 901 at a timing based on the result of determination by the determination unit 150. Thus, the image processing apparatus 100 according to this embodiment has a function as a shutter control apparatus that controls the shutter 901.

The result of determination by the determination unit 150 is the result of the determination unit 150 determining whether there is a damaged pixel or not for the imaging data acquired in a state where the shutter 901 is closed. Therefore, the timing based on the result of determination can be, for example, a timing according to the presence or absence of a damaged pixel.

Figure 3:
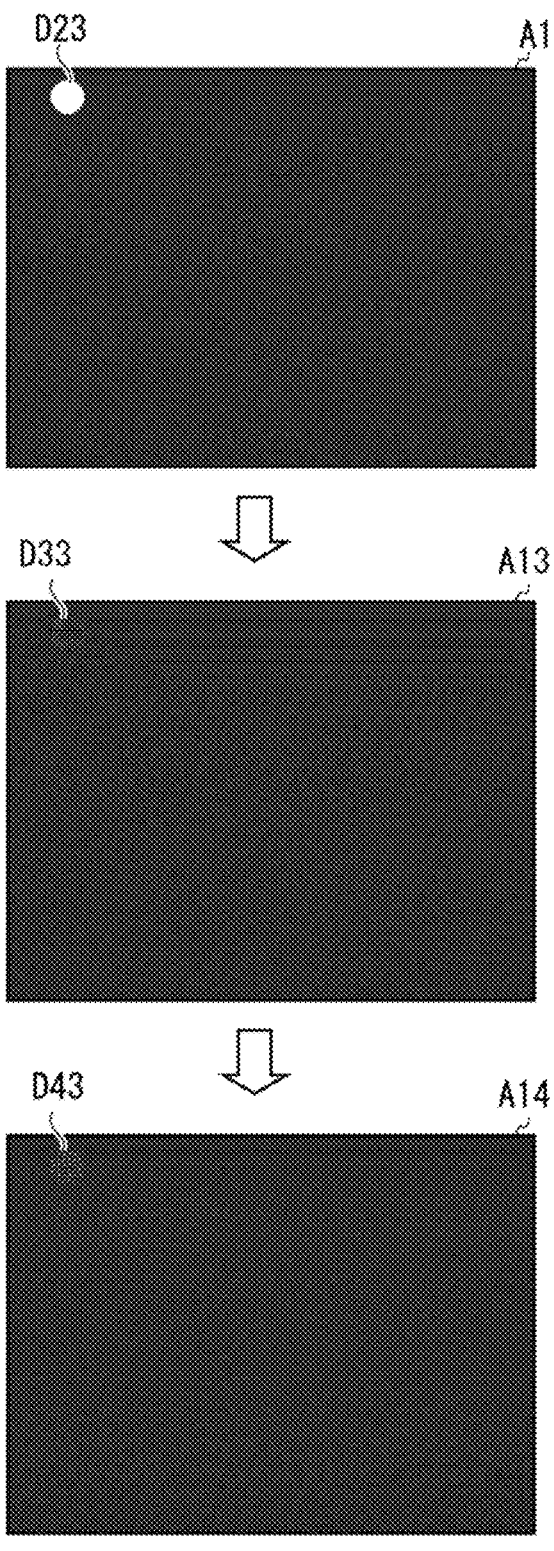
FIG. 3 is a schematic diagram showing an example of imaging data acquired after shutter closing control in the image processing apparatus in FIG. 1.

The timing of opening the shutter based on the result of determination by the determination unit 150 will be described with reference to FIG. 3, taking an example of recovery of damaged pixels. FIG. 3 is a schematic diagram showing an example of imaging data acquired after shutter closing control in the image processing apparatus 100 in FIG. 1, and is a schematic diagram showing an example of how damaged pixels recover in imaging data acquired after shutter closing control.

For example, when the thermal image A11 in FIG. 2 is acquired and a group of pixels corresponding to the sun is detected as predetermined saturated pixels H13, the shutter control unit 160 performs control to close the shutter 901, and the shutter 901 is closed. Thus, the thermal image A12 captured with the shutter 901 closed includes the damaged pixel group D23. Note that in FIGS. 2 and 3, the thermal image A12 is an example of an image acquired after a time for several frames required for detection has elapsed since the time point of acquisition of the thermal image A11.

As shown in FIG. 3, the acquired thermal image changes to recover damage with the passage of time from the thermal image A12 including the damaged pixel group D23 to a thermal image A13 including a damaged pixel group D33 to a thermal image A14 including a damaged pixel group D43 and so on. In FIG. 3, an example is taken in which the thermal image A13 and the thermal image A14 are thermal images acquired 20 seconds and 2 minutes, respectively, after the time point of acquisition of the thermal image A12.

In FIG. 3, it can be seen that the white color decreases with time in the order of the damaged pixel group D23, the damaged pixel group D33, and the damaged pixel group D43, that is, the white spot fades gradually. Note that in FIG. 3, the damaged pixel group D43 is drawn somewhat brightly for convenience, but it is intended to show that the damage has almost recovered.

As illustrated by an example in FIG. 3, the damage recovers with time. Therefore, when there is a damaged pixel, the shutter control unit 160 may control the shutter 901 to open at the timing when an expected time for its recovery has elapsed.

For example, the shutter control unit 160 can perform control to open the shutter 901 at the timing when the damage to the pixel is assumed to be in a state as shown by the damaged pixel group D33 of the thermal image A13 (in the above example, 20 seconds later). Supplementally, for example, the process of detecting a predetermined saturated pixel by the saturation detection unit 140, that is, the process of determining whether sunlight is incident or not can be performed using imaging data for several frames, and the shutter 901 can be closed immediately thereafter. Therefore, the time for which infrared detection elements are damaged when sunlight is incident is limited to the time corresponding to the several frames, they are not damaged seriously, and if the shutter 901 is closed, for example, for several seconds or about 20 seconds, they can be recovered to some extent. Note that some damage may occur which does not improve even after a week has passed, but if the shutter 901 is closed, for example, for about 20 seconds, some recovery can be expected.

Alternatively, the shutter control unit 160 can perform control to open the shutter 901 at the timing when the damage to the pixel is assumed to be in a state as shown by the damaged pixel group D43 of the thermal image A14 (in the above example, 2 minutes later). Alternatively, the shutter control unit 160 can perform control to open the shutter 901 at the timing when the damage is assumed to become an all-black thermal image not shown.

In these examples, the assumed timing can be determined as an elapsed time from the time point when the shutter 901 is closed or the time point when it is closed and imaging data is acquired. Note that the elapsed time can also be determined in advance as the number of captured frames corresponding to that time. The timing when the shutter control unit 160 opens the shutter 901 is not limited to these examples, but can be determined in advance as an elapsed time from, for example, the time point when the shutter 901 is closed. Further, the elapsed time can be determined in advance as a time corresponding to the determined level of damage.

Although in any of the timing examples, a description has been given on the premise that there is the damaged pixel, but if there is no damaged pixel, the shutter 901 can be opened without considering the recovery of the damage.

Thus, when it is determined in the determination unit 150 that there is the damaged pixel, the shutter control unit 160 can perform control to open the shutter 901 after a longer time has elapsed than when it is not determined that there is the damaged pixel. Such control makes it unnecessary to wastefully keep the shutter 901 closed for a long time when there is no damaged pixel.

Figure 4:
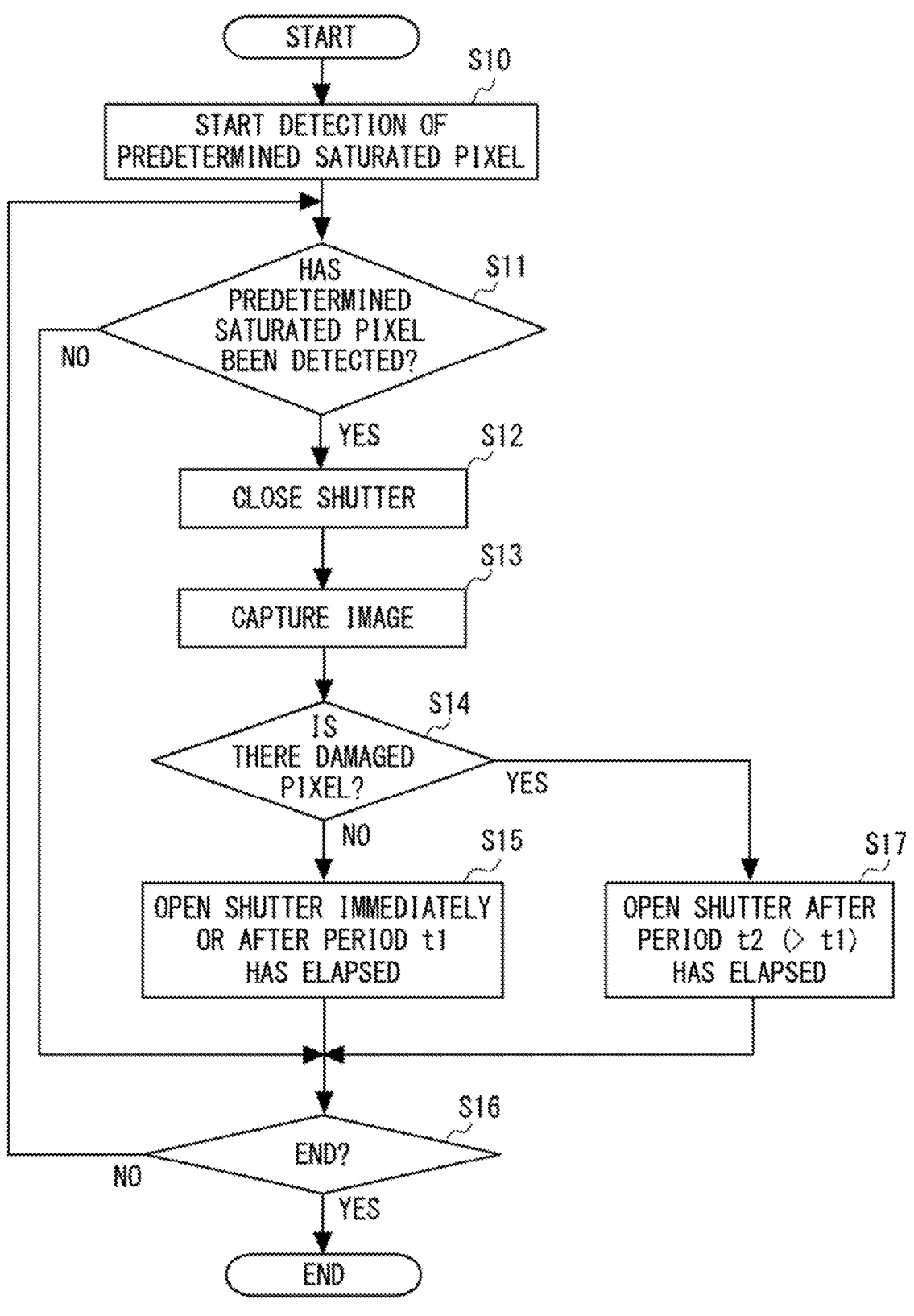
FIG. 4 is a flowchart for explaining an example of processing performed by the image processing apparatus in FIG. 1.

Next, with reference to FIG. 4, an example of processing performed by the image processing apparatus 100 having the above configuration will be described. FIG. 4 is a flowchart for explaining an example of processing performed by the image processing apparatus 100 in FIG. 1.

The flowchart shown in FIG. 4 is started when the image processing apparatus 100 receives imaging data from the microbolometer 900. That is, when the image processing apparatus 100 receives imaging data from the microbolometer 900, the saturation detection unit 140 starts detection of a predetermined saturated pixel from the imaging data (e.g., the thermal image A11 in FIG. 2) after correction by defective pixel correction unit 110 (step S10).

Next, the image processing apparatus 100 determines whether a predetermined saturated pixel has been detected or not in the imaging data (step S11). When it is determined that no predetermined saturated pixels have been detected in the imaging data (step S11: NO), the image processing apparatus 100 proceeds to step S16.

When it is determined that a predetermined saturated pixel has been detected in the imaging data (step S11: Yes), the image processing apparatus 100 closes the shutter 901 (step S12). The image processing apparatus 100 causes the microbolometer 900 to capture an image of the shutter 901 in that state to acquire imaging data (step S13).

When the thermal image A11 in FIG. 2 is the detection target of a predetermined saturated pixel, the imaging data acquired in step S13 is, for example, the data shown in the thermal image A12 in FIGS. 2 and 3. The thermal image A12 includes a damaged pixel group D23 based on the saturated pixel group H13 generated by capturing an image of the sun shown in the thermal image A11.

Following step S13, the image processing apparatus 100 determines whether there is a damaged pixel or not within the range where the predetermined saturated pixel is detected in the acquired imaging data (step S14). When the thermal image A12 is acquired, the determination in step S14 is YES, and when the damage becomes a uniform thermal image not shown and the uniform thermal image is acquired, NO is obtained in step S14.

When it is determined that there is no damaged pixel in the above range (step S14: NO), the image processing apparatus 100 opens the shutter 901 immediately or after a period t1 has elapsed since the time point of closing of the shutter 901 (step S15).

Note that "immediately" in step S15 refers to opening the shutter 901 immediately when the determination in step S14 is NO. "After a period t1 has elapsed" in step S15 refers to opening the shutter 901 after the period t1 has elapsed since the time point of closing of the shutter 901 in step S12 when the determination in step S14 is NO. The value of t1 can be determined in advance as the maximum time required for detection of damage, for example, can be set to about 0.1 seconds.

After step S15, the image processing apparatus 100 determines whether to end the processing or not by detecting whether imaging data is no longer received from the microbolometer 900 by, for example, receiving an instruction to end image capturing or imaging data is continuously received (step S16). The image processing apparatus 100 returns to step S11 and repeats the same processing if NO in step S16, and ends the process if YES in step S16.

On the other hand, when it is determined that there is the damaged pixel in the above range (step S14: YES), the image processing apparatus 100 opens the shutter 901 after a period t2 has elapsed since the time point of closing of the shutter 901 (step S17). The period t2 can be set to a longer period than the period t1, for example, can be set in advance as 20 seconds. The period t2 can be set, for example, based on experimental results that show recovery under environmental conditions such as certain seasonal conditions. However, whether it will always recover in the set period t2 or not depends on the environment such as the season, weather, and time of day. Therefore, the period t2 can be changed according to the incident conditions of sunlight that change depending on the environment such as the season, weather, and time of day. After step S17, the image processing apparatus 100 executes the processing of step S16.

The first embodiment has been described above. In this embodiment, as described above, the shutter 901 is not closed whenever there is a saturated pixel, but the shutter 901 is closed when a predetermined saturated pixel, which is a saturated pixel that satisfies a predetermined condition, is detected. Further, in this embodiment, as described above, the shutter 901 is opened at a timing based on the result of determination by the determination unit 150 in a state where the shutter 901 is closed.

Therefore, according to this embodiment, in protecting the microbolometer 900 by closing the shutter 901, it is possible to delay the timing of starting control to close the shutter 901, or advance the timing of performing control to open the shutter 901. That is, according to this embodiment, it is consequently possible to shorten the time for which the shutter 901 is closed.

For example, even when the thermal image display system 10 is mounted on an automobile, it is possible to reduce scenes such that by closing the shutter 901, an object such as a pedestrian cannot be detected and the safety support for the automobile is hindered. The microbolometer 900 can also be used for the purpose of monitoring, observation, and the like in various scenes other than being used for automobiles, and whichever purpose it is used for, the purpose cannot be fulfilled while the shutter 901 is closed for the protection of the microbolometer 900. However, since this embodiment can shorten the period, the original purpose can be achieved as much as possible.

In particular, in this embodiment, it is not necessary to wastefully keep the shutter 901 closed for a long time when there is no damaged pixel by performing control such that the period t2 in FIG. 4 is set to be longer than the period t1.

Finally, another example condition related to the degree of saturation that can be used as a predetermined condition or included as one condition of predetermined conditions will be described. As described above, when the infrared detection elements are not damaged, a thermal image when the shutter 901 is closed has uniform outputs on the whole screen. On the other hand, the pixel values (output levels) of the pixels corresponding to infrared detection elements that have more or less been damaged show abnormal values, and there will be a difference compared with the pixel values of normal pixels such as peripheral normal pixels.

Therefore, since it can be determined that the larger this difference in pixel value, the greater the damage to the pixel, the determination unit 150 can discriminate between saturation due to sunlight and saturation due to other factors by setting a threshold value for this difference in pixel value and performing threshold processing. Thus, a condition that such a difference in pixel value is larger than a predetermined value can be employed as a condition related to the degree of saturation, in which case the saturation detection unit 140 obtains the result of determination by the determination unit 150 and then detects a predetermined saturated pixel.

Thus, the saturation detection unit 140 can obtain the result of the determination unit 150 determining, based on a thermal image captured with the shutter 901 opened and a thermal image captured with the shutter 901 closed, whether a pixel in the former thermal image is sunlight or not, and then perform detection of a predetermined saturated pixel. However, in this example, since the saturation detection unit 140 obtains the result of the determination unit 150 discriminating between saturation due to sunlight and saturation due to a high-temperature part caused by factors other than sunlight according to the degree of damage and then detects a predetermined saturated pixel, the shutter 901 is closed at the time of the detection.

Therefore, the shutter control unit 160 may perform control to immediately open the shutter 901 when a predetermined saturated pixel is not detected by the above threshold processing, and performs control to continue the closed state of the shutter 901 only when one is detected. It can be said that such control enables the saturation detection unit 140 to shorten the time for which the shutter 901 is closed even when saturation due to sunlight is discriminated from saturation due to a high-temperature part caused by factors other than sunlight according to the degree of damage.

Second Embodiment

Next, a second embodiment will be described. Since an image processing apparatus according to the second embodiment is obtained by changing some processes in the image processing apparatus 100 in FIG. 1, this embodiment will also be described with reference to the image processing apparatus 100 in FIG. 1. Note that although the description will be omitted, various application examples described in the first embodiment can also be applied in this embodiment.

The shutter control unit 160 in this embodiment differs from that in the first embodiment in that it performs control as follows. When the determination unit 150 determines that there is the damaged pixel, the shutter control unit 160 performs control to open the shutter 901 at the timing based on the result of re-determination by the determination unit 150 after a longer time has elapsed than when it is not determined that there is the damaged pixel.

That is, in the first embodiment, the timing when the shutter control unit 160 opens the shutter 901 is determined in advance based on the elapsed time from the time point when the shutter 901 is closed. Further, in the first embodiment, this elapsed time can be determined in advance as a time corresponding to the determined level of damage. On the other hand, in this embodiment, the presence or absence of damage or the level of damage is re-determined for a pixel showing that it is damaged, and the shutter 901 is controlled to be opened at the timing based on the re-determination result, which is that determination result. Of course, the re-determination of damage can be performed a plurality of times.

Here, the timing based on the re-determination result can be a timing according to the presence or absence of a damaged pixel. For example, between the case where there is a damaged pixel and the case where there is no damaged pixel as a result of re-determination, an earlier timing can be used in the latter case, as with the timing based on the determination result in the first embodiment. As a more specific example, the timing based on the re-determination result can be the timing when the re-determination result indicates that the target pixel has returned to the normal state. That is, this embodiment can employ a configuration in which, when there is a damaged pixel, the shutter 901 is kept closed and image capturing is performed a plurality of times, and the shutter 901 is controlled to open at the stage where the damaged pixel is no longer present (at the stage where the corresponding infrared detection element has recovered).

Alternatively, this embodiment can also employ a configuration in which, when there is a damaged pixel, the shutter 901 is kept closed and image capturing is performed a plurality of times, and the shutter 901 is controlled to open at the stage where the damage has reduced to a predetermined level. This makes it possible to open the shutter 901 at the timing when it can be determined that there is no problem even if the shutter 901 is opened.

Thus, taking advantage of the fact that the damage recovers with time, the shutter control unit 160 may control the shutter 901 to open at a timing corresponding to the degree of recovery of the damage while confirming the degree of recovery of the damage using the result of re-determination by the determination unit 150.

As described in the first embodiment, the determination unit 150 can determine whether a pixel has been damaged or not using, for example, a difference value from a frame statistical value (e.g., an average value, a median value, or a minimum value) when an image of the shutter 901 is captured. Therefore, similarly for the degree of recovery, the determination unit 150 can determine that the pixel has recovered when the pixel difference between the frame statistical value and the damaged pixel when an image of the shutter 901 is captured becomes less than or equal to a predetermined value. Further, by setting predetermined values at a plurality of levels, the determination unit 150 can also determine to what extent the pixel has recovered by threshold processing using these predetermined values.

Note that this embodiment can also use various pixel values to be compared for the method of determining whether a pixel has been damaged or not in the determination unit 150 as described in the first embodiment.

Similarly, the method of determining the degree of recovery in the determination unit 150 can also determine that the pixel has recovered when the difference from the pixel value to be compared becomes less than or equal to a predetermined value, and can also determine to what extent the pixel has recovered by setting predetermined values at a plurality of levels.

A specific example of the degree of recovery will be described with reference to FIG. 3. For example, the shutter control unit 160 can perform control to open the shutter 901 at the timing when the damage is in the state as shown by the damaged pixel group D33 in the thermal image A13 as a result of re-determination. Alternatively, the shutter control unit 160 can also perform control to open the shutter 901 at the timing when the damage is in the state as shown by the damaged pixel group D43 in the thermal image A14 as a result of re-determination. It can be said that these examples are effective in ensuring the state where image capturing can be performed for as long as possible. In particular, when the image processing apparatus 100 is used in consideration of safety as in an in-vehicle camera, it is also effective in terms of safety. However, the shutter control unit 160 can also perform control to open the shutter 901 at the timing when the damage becomes an all-black thermal image not shown as a result of re-determination.

Figure 5:
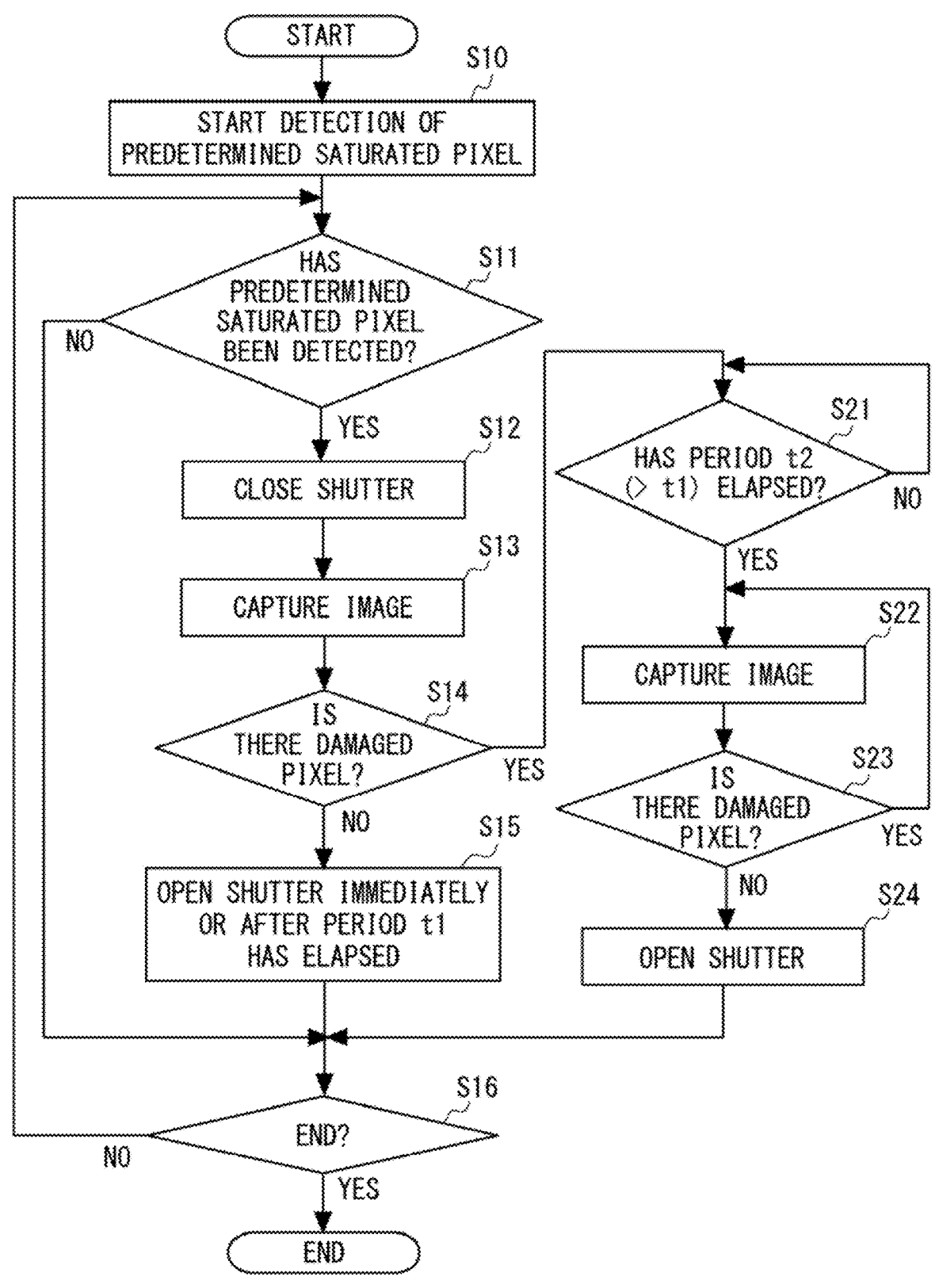
FIG. 5 is a flowchart for explaining an example of processing performed by an image processing apparatus according to a second embodiment.

Next, with reference to FIG. 5, the processing performed by the image processing apparatus 100 according to this embodiment will be described. FIG. 5 is a flowchart for explaining an example of image processing performed by the image processing apparatus according to this embodiment.

The flowchart shown in FIG. 5 differs in the processing after YES is obtained in step S14 in the flowchart in FIG. 4. Hereinafter, the differences from the flowchart in FIG. 4 will mainly be described from the scene where YES is obtained in step S14.

When determining that there is the damaged pixel (step S14: YES), the image processing apparatus 100 determines whether a period t2 (t2>t1) has elapsed or not since the time point of closing of the shutter 901 (step S21), and waits until it elapses. This embodiment can also change the period t2 according to the incident conditions of sunlight that change depending on the season, weather, time of day, or the like.

When the period t2 has elapsed (step S21: YES), the image processing apparatus 100 causes the microbolometer 900 to capture an image of the shutter 901 with the shutter 901 still closed to acquire imaging data (step S22). Next, as in step S14, the image processing apparatus 100 determines whether the damage remains or not for at least a pixel in the damaged range in step S14 (step S23). Note that this range can be the range to be determined in step S14.

When a damaged pixel remains (step S23: YES), the image processing apparatus 100 returns to step S22 and repeats image capturing and determination until the state where no damaged pixel remains (until NO is obtained in step S23). When the damaged pixel has recovered and does not remain (step S23: NO), the image processing apparatus 100 immediately opens the shutter 901 (step S24). After step S24, the image processing apparatus 100 executes the processing of step S16.

Figure 6:
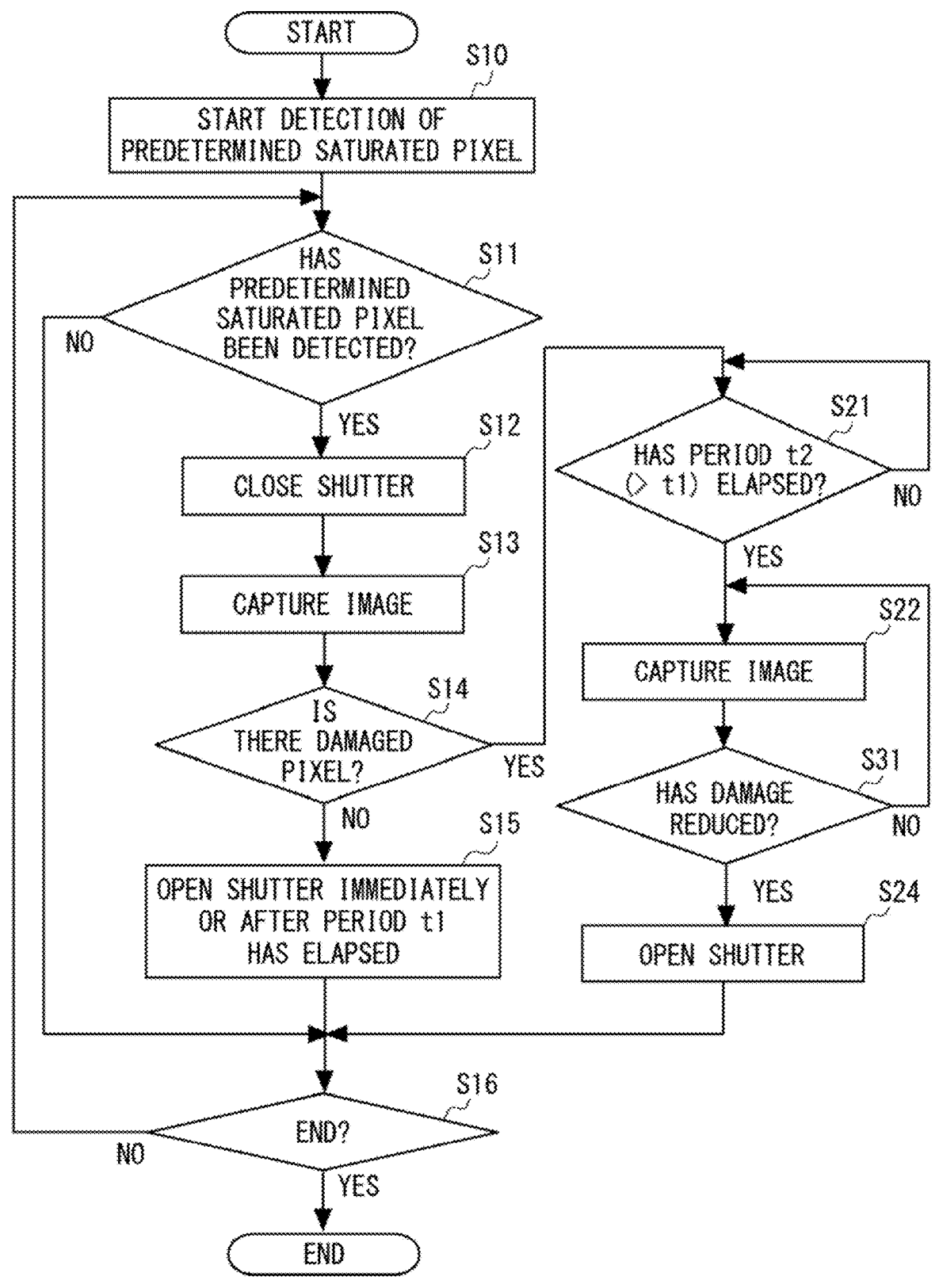
FIG. 6 is a flowchart for explaining another example of processing performed by the image processing apparatus according to the second embodiment.

Next, with reference to FIG. 6, another example of processing performed by the image processing apparatus 100 according to this embodiment will be described. FIG. 6 is a flowchart for explaining another example of image processing performed by the image processing apparatus according to this embodiment.

The flowchart shown in FIG. 6 differs in the processing after the processing of step S22 in the flowchart shown in FIG. 5. Hereinafter, the differences from the flowchart in FIG. 5 will mainly be described from the scene where YES is obtained in step S21.

When the period t2 has elapsed (step S21: YES), the image processing apparatus 100 causes the microbolometer 900 to capture an image of the shutter 901 with the shutter 901 still closed to acquire imaging data (step S22). Next, the image processing apparatus 100 determines whether or not the damage has reduced by a predetermined value or more for at least a pixel in the damaged range in step S14 (step S31).

When the damaged pixel has not reduced by the predetermined value or more (step S31: NO), the image processing apparatus 100 returns to step S22 and repeats image capturing and determination until the state where the damaged pixel has reduced by the predetermined value or more (until YES is obtained in step S31). When the damaged pixel has reduced by the predetermined value or more (step S31: YES), the image processing apparatus 100 immediately opens the shutter 901 (step S24). After step S24, the image processing apparatus 100 executes the processing of step S16.

The second embodiment has been described above. With the above-described configuration, the image processing apparatus 100 according to this embodiment performs control to open the shutter 901 after confirming that the damage has recovered, so it is possible to avoid capturing images for monitoring objects or the like at the stage where the damage has not recovered.

Alternatives, Etc.

The program described above includes a set of instructions (or software codes) for causing a computer to perform one or more of the functions described in the embodiments when loaded into the computer. The program may be stored on a non-transitory computer-readable medium or a tangible storage medium. By way of example but not limitation, computer-readable media or tangible storage media include a random-access memory (RAM), a read-only memory (ROM), a flash memory, a solid-state drive (SSD) or other memory technologies, a CD-ROM, a digital versatile disc (DVD), a Blu-ray (R) disc or other optical disc storages, a magnetic cassette, a magnetic tape, a magnetic disk storage or other magnetic storage devices. The program may be transmitted on a transitory computer-readable medium or communication medium. By way of example but not limitation, transitory computer-readable media or communication media include electrical, optical, acoustic, or other forms of propagation signals.

Note that the present disclosure is not limited to the above embodiments, and can be appropriately modified within a range not departing from the scope and spirit.

For example, instead of detection of a predetermined saturated pixel in the first and second embodiments, it is also possible to perform detection of a saturated pixel and perform control to close the shutter 901 when a saturated pixel is detected. In that case, it is possible to determine whether there is damaged pixel or not in the range where the saturated pixel is detected from imaging data in the state where the shutter 901 is closed, and to perform control to open the shutter 901 at the timing based on the determination result. Thus, the image processing apparatus 100 can employ a configuration in which detection independent of the predetermined condition is performed. Even in an image processing apparatus employing such a configuration, in protecting the microbolometer 900 by closing the shutter 901, it is possible to advance the timing of performing control to open the shutter 901 and thus shorten the time for which the shutter 901 is closed.

Further, the image processing apparatus in the various examples described above is not limited to automobiles but can be applied to various types of mobile bodies such as motorcycles, ships, airplanes, robots, and drones. Further, the image processing apparatus can also be used for other purposes than being used for automobiles as described above. For example, the image processing apparatus can be applied to various image capturing apparatuses capable of capturing a thermal image, such as fixed-point observation cameras capable of capturing a thermal image, and the uses of the image capturing apparatus are not limited. By including the image processing apparatus described above, a fixed-point observation camera capable of capturing a thermal image can beneficially use its function, that is, it can shorten the closure time in the control to close the shutter when saturation of pixels is detected.

Further, in the above embodiment, the thermal image display system 10 including the monitor 902 is taken as an example of incorporating the image processing apparatus, but the image processing apparatus can also be incorporated into a system including no monitor. For example, the image processing apparatus can be incorporated into an object sensing system including a recognition processing unit that recognizes (senses) an object such as a person that meets a predetermined condition such as a shape or a movement based on an image output from the AGC processing unit 130, and a notification unit that makes a notification when an object is sensed.

According to the present disclosure, it is possible to provide an image processing apparatus, an image processing method, and a program capable of shortening the time for which a shutter is closed in protecting a sensor for capturing a thermal image by closing the shutter.

The image processing apparatus, the image processing method, and the program according to the present disclosure can be used for a sensor for capturing a thermal image to shorten the time for which a shutter is closed in protecting the sensor by closing the shutter, so they have industrial applicability.

What is claimed is:

1. An image processing apparatus comprising:
a processor coupled to a memory storing instructions for the processor to execute:
a saturation detection unit that detects a predetermined saturated pixel, which is a saturated pixel that satisfies a predetermined condition, from thermal image data acquired by a sensor that captures a thermal image;
a shutter control unit that controls operation of a shutter that blocks incidence of light on the sensor; and
a determination unit that determines whether there is a damaged pixel whose pixel value shows an abnormal value in a range where the saturation detection unit detects the predetermined saturated pixel from the thermal image data acquired by capturing an image of the shutter having a uniform temperature in a state where incidence of light on the sensor is blocked by the shutter,
wherein the shutter control unit closes the shutter when the saturation detection unit detects the predetermined saturated pixel, and when it is determined in the determination unit that there is no damaged pixel in the thermal image data captured when the shutter is closed, performs control to open the shutter immediately or after a lapse of a predetermined period of time that is determined in advance as a maximum time required for detection processing of the predetermined saturated pixel, or when it is determined in the determination unit that there is the damaged pixel in the thermal image data captured when the shutter is closed, performs control to open the shutter after a lapse of a time in which recovery of the damaged pixel is expected,
wherein the determination unit further determines a level of damage to the damaged pixel, and
wherein, when it is determined in the determination unit that there is the damaged pixel the shutter control unit performs control to open the shutter after a lapse of a predetermined time in which recovery of the damaged pixel is assumed according to the determined level of damage.

2. The image processing apparatus according to claim 1, wherein when determining that there is the damaged pixel, the determination unit determines whether there is the damaged pixel a plurality of times with the shutter closed, and the shutter control unit performs control to open the shutter after a lapse of the predetermined time based on the plurality of times of determination by the determination unit.

3. An image processing method comprising:

a saturation detection step of detecting a predetermined saturated pixel, which is a saturated pixel that satisfies a predetermined condition, from thermal image data acquired by a sensor that captures a thermal image;

a step of performing control to close a shutter that blocks incidence of light on the sensor when the predetermined saturated pixel is detected in the saturation detection step;

a determination step of determining whether there is a damaged pixel whose pixel value shows an abnormal value in a range where the predetermined saturated pixel is detected in the saturation detection step from the thermal image data acquired by capturing an image of the shutter having a uniform temperature in a state where incidence of light on the sensor is blocked by the shutter; and an open control step of, when it is determined in the determination step that there is no damaged pixel in the thermal image data captured when the shutter is closed, performing control to open the shutter immediately or after a lapse of a predetermined period of time that is determined in advance as a maximum time required for detection processing of the predetermined saturated pixel, or when it is determined in the determination step that there is the damaged pixel in the thermal image data captured when the shutter is closed, performing control to open the shutter after a lapse of a time in which recovery of the damaged pixel is expected, wherein the determination step further includes a step of determining a level of damage to the damaged pixel, and the open control step includes a step of, when it is determined in the determination step that there is the damaged pixel, performing control to open the shutter after a lapse of a predetermined time in which recovery of the damaged pixel is assumed according to the determined level of damage.

4. A non-transitory computer-readable medium storing a program that causes a computer to execute processing including:

a saturation detection step of detecting a predetermined saturated pixel, which is a saturated pixel that satisfies a predetermined condition, from thermal image data acquired by a sensor that captures a thermal image;

a step of performing control to close a shutter that blocks incidence of light on the sensor when the predetermined saturated pixel is detected in the saturation detection step;

a determination step of determining whether there is a damaged pixel whose pixel value shows an abnormal value in a range where the predetermined saturated pixel is detected in the saturation detection step from the thermal image data acquired by capturing an image of the shutter having a uniform temperature in a state where incidence of light on the sensor is blocked by the shutter; and an open control step of, when it is determined in the determination step that there is no damaged pixel in the thermal image data captured when the shutter is closed, performing control to open the shutter immediately or after a lapse of a predetermined period of time that is determined in advance as a maximum time required for detection processing of the predetermined saturated pixel, or when it is determined in the determination step that there is the damaged pixel in the thermal image data captured when the shutter is closed, performing control to open the shutter after a lapse of a time in which recovery of the damaged pixel is expected, wherein the determination step further includes a step of determining a level of damage to the damaged pixel, and the open control step includes a step of, when it is determined in the determination step that there is the damaged pixel, performing control to open the shutter after a lapse of a predetermined time in which recovery of the damaged pixel is assumed according to the determined level of damage.

\* \* \* \* \*